(12) United States Patent
Criado et al.

(10) Patent No.: US 7,122,249 B2
(45) Date of Patent: Oct. 17, 2006

(54) ABRASION-RESISTANT AGGLOMERATE MINERAL SUBSTANCE GRANULE, POWDER COMPRISING SUCH GRANULES AND PRODUCTION METHOD THEREFOR

(75) Inventors: Claude Criado, Dombasle-sur-Meurthe (FR); Francis Grosjean, Dombasle-sur-Meurthe (FR); Gilles Meunier, Dombasle-sur-Meurthe (FR)

(73) Assignee: Solvay (Societe Anonyme), Brussels (BE)

( * ) Notice: Subject to any disclaimer, the term of this patent is extended or adjusted under 35 U.S.C. 154(b) by 0 days.

(21) Appl. No.: 10/468,860

(22) PCT Filed: Feb. 22, 2002

(86) PCT No.: PCT/EP02/01980

§ 371 (c)(1),
(2), (4) Date: Oct. 24, 2003

(87) PCT Pub. No.: WO02/068328

PCT Pub. Date: Sep. 6, 2002

(65) Prior Publication Data

US 2004/0219396 A1 Nov. 4, 2004

(30) Foreign Application Priority Data

Feb. 26, 2001 (FR) .................................... 01 02687

(51) Int. Cl.
*B32B 5/16* (2006.01)
*B05D 7/00* (2006.01)

(52) U.S. Cl. ..................................... 428/403; 427/215

(58) Field of Classification Search ................ 427/212, 427/213, 215; 428/403
See application file for complete search history.

(56) References Cited

U.S. PATENT DOCUMENTS

| 1,546,156 | A |   | 7/1925  | Welter |
|-----------|---|---|---------|--------|
| 2,721,209 | A | * | 10/1955 | Dauncey et al. ............ 117/68 |
| 2,926,995 | A | * | 3/1960  | Mod et al. ................. 423/190 |

(Continued)

FOREIGN PATENT DOCUMENTS

EP     0 395 134     10/1990

(Continued)

*Primary Examiner*—H. Thi Le
(74) *Attorney, Agent, or Firm*—Oblon, Spivak, McClelland, Maier & Neustadt, P.C.

(57) ABSTRACT

Granule comprising an agglomerate of particles of a mineral substance. The agglomerate is coated with a monolithic outer layer, which provides it with improved abrasion resistance.

Powder comprising granules according to the invention.

Process for manufacturing the powder according to the invention, which includes an agglomeration step and a coating step.

31 Claims, 1 Drawing Sheet

U.S. PATENT DOCUMENTS

| | | | |
|---|---|---|---|
| 3,141,730 A * | 7/1964 | Le Baron | 423/422 |
| 3,625,866 A * | 12/1971 | Conde | 502/68 |
| 3,647,365 A * | 3/1972 | Saeman | 423/209 |
| 3,855,397 A * | 12/1974 | Hoffman et al. | 423/422 |
| 3,917,663 A * | 11/1975 | Kegelart et al. | 423/415.2 |
| 4,117,097 A * | 9/1978 | Klebe et al. | 423/415.2 |
| 4,211,759 A * | 7/1980 | Mollard | 423/281 |
| 4,419,250 A * | 12/1983 | Allen et al. | 510/515 |
| 4,428,914 A * | 1/1984 | Brichard et al. | 423/265 |
| 5,290,322 A * | 3/1994 | Breton et al. | 23/302 T |
| 5,296,000 A * | 3/1994 | Darmont et al. | 23/295 R |
| 5,328,721 A * | 7/1994 | Guiliano et al. | 427/213 |
| 5,411,750 A * | 5/1995 | Lajoie et al. | 424/717 |
| 5,445,805 A * | 8/1995 | Zuccarello et al. | 423/422 |
| 5,690,701 A | 11/1997 | Bigini | |
| 5,702,635 A * | 12/1997 | Trani et al. | 252/186.27 |
| 5,707,959 A * | 1/1998 | Pancheri et al. | 510/444 |
| 5,935,708 A * | 8/1999 | Schuette et al. | 428/403 |
| 6,340,452 B1 * | 1/2002 | Bossoutrot et al. | 423/415.2 |
| 6,350,428 B1 * | 2/2002 | Verduijn et al. | 423/702 |
| 6,465,408 B1 * | 10/2002 | Lee et al. | 510/349 |
| 6,478,828 B1 * | 11/2002 | Ninane et al. | 23/301 |
| 6,641,866 B1 * | 11/2003 | Lee et al. | 427/213 |
| 6,808,700 B1 * | 10/2004 | Kiji et al. | 424/49 |

FOREIGN PATENT DOCUMENTS

| | | |
|---|---|---|
| EP | 0 535 013 B1 * | 5/1994 |
| EP | 0 733 590 A1 * | 9/1996 |

\* cited by examiner

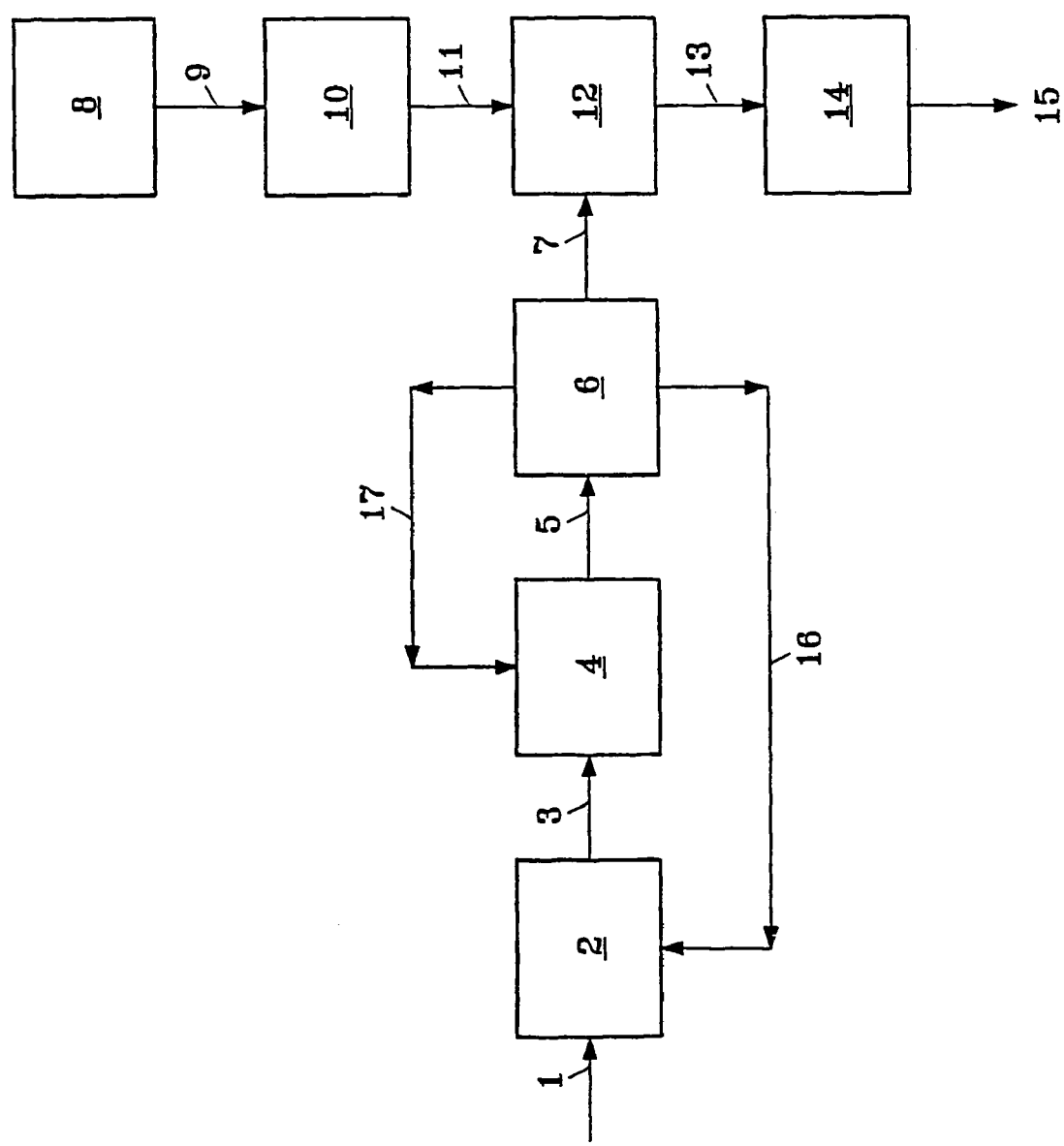

ABRASION-RESISTANT AGGLOMERATE MINERAL SUBSTANCE GRANULE, POWDER COMPRISING SUCH GRANULES AND PRODUCTION METHOD THEREFOR

The invention relates to abrasion-resistant granules of an agglomerated mineral substance. The invention also relates to a powder formed from such granules, to its use and to a process for manufacturing it.

Many mineral substances, such as for example sodium or magnesium salts, are often used in the form of granules.

For these granules to be used effectively, they must in general have an appropriate size. For example, for many applications, such as additives for detergents or for medical or pharmaceutical uses, the mean diameter of the granules is ideally between 250 and 1000 microns.

An important characteristic of the techniques for producing granules is their particle size distribution. Such techniques result in remarkably narrow distributions. Unfortunately, they are generally more expensive. If it is desired to have a technique that operates economically, the particle size distribution is usually very wide, which has the consequence that the size of all the granules obtained is rarely satisfactory for a given application. Under these conditions, it is known to separate the granules according to their size, for example by screening, so as to assign them to different applications.

In order for all that produced to be used, it would be necessary for the consumption of the various particle size classes to correspond to the quantities produced. This is rarely the case and there is a surplus, the quantities with fine particle sizes often being in excess over those with coarse particle sizes.

In addition, when the granules are produced by crystallizers, the productivity (expressed as tons/hour for example) decreases substantially when it is desired to produce coarse-diameter granules. Concomitantly, their manufacturing cost obviously increases.

To solve this problem, it is known to agglomerate fine particles of a mineral substance in order to obtain coarser ones. Mechanical agglomeration techniques such as compacting can be used. However, these agglomerated products have the disadvantage of being friable. As a result of their poor abrasion resistance, fine particles reappear when handling them. In addition, these known agglomeration techniques are applicable only to mineral substances that agglomerate easily. For others, the friability of these known granules is such that they are difficult to use.

It has been attempted to remedy this drawback by using anionic surfactant additives during the manufacture of the agglomerates. Such a use is described, for example, in European Patent Application EP 0 452 164 which relates to sodium perborate tetrahydrate with improved abrasion resistance, formed from separate particle agglomerates. The dimensions of the said particles do not exceed 30 µm. However, the use of additives is a drawback for the production of granules of a mineral substance when the latter has to be of high purity. In particular, pharmaceutical applications require such high-purity products.

The invention therefore aims to remedy these drawbacks by providing granules of an agglomerated mineral substance, which exhibit good abrasion resistance and can be produced by a process that is simple and economic and does not require the use of any additive.

Consequently, the invention relates to a granule comprising an agglomerate of particles of a mineral substance, which is characterized in that the agglomerate is coated with a monolithic outer layer.

The granule according to the invention may be of any shape. It may have a small diameter or a larger diameter. The economic benefit of the invention will, however, be more pronounced in the case of large-diameter granules. This is because the production cost of granules according to the invention increases more slowly with the diameters produced than these of the known granules.

It is advantageous for the granule according to the invention to have a mean diameter between 200 µm and 5000 µm. Preferably, its mean diameter is greater than 250 µm. Preferably, it is less than 2500 µm. When the granule is approximately spherical, this mean diameter is its diameter. When the granule is of any shape, its mean diameter is defined as being six times the ratio of its volume to its external surface area.

The mineral substance to which the invention applies may be any mineral substance from which it is desired to form granules from smaller particles. As an example, mention may be made of: sodium or magnesium chlorides, sodium carbonate and sodium bicarbonate. It is advantageous to apply the invention to mineral substances that give rise to particle agglomerates having poor mechanical properties.

The invention is particularly well suited to sodium bicarbonate.

Depending on its mean diameter and the size of the particles from which it is formed, the agglomerate contains a variable number of these particles, namely from a few tens of particles to several million.

According to the invention, the agglomerate is coated with a monolithic outer layer. The term "monolithic layer" is understood to mean a layer of material that is essentially continuous. It is not agglomerated. The material from which it is formed is essentially made as a single unitary, non-agglomerated block. It is preferably in a crystalline state. The layer may be a single crystal. More generally, it is a polycrystal. The monolithic layer forms an envelope around the agglomerate, the function of which is to mechanically retain the agglomerated particles. It may be impermeable or porous and have defects, provided that they fulfil its function. The monolithic layer that coats the agglomerate may in certain places also penetrate more deeply into it, by infiltration of cracks initially present in the agglomerate.

The thickness of the coating layer must be sufficient for fulfilling its technical function defined above and for providing the required good mechanical properties. It is unnecessary for its thickness to be too great, as this would reduce the economic advantages of the invention.

The minimum thickness of the monolithic layer depends on various parameters, among which are, in particular, the substance from which it is formed, the size of the agglomerate, the mean diameter of the constituent particles and the desired mechanical strength. As a general rule, it must be determined in each particular case by a routine laboratory study.

The monolithic outer layer generally has a thickness of greater than 0.25 µm. It is generally advantageous for this layer not to exceed 50 µm. It has been observed that monolithic outer layers having a thickness of greater than 0.5 µm are particularly suitable. Preferably, their thickness is less than or equal to 30 µm.

According to the invention, coating the agglomerates with the monolithic outer layer substantially improves their abrasion resistance.

The choice of constituent material of the outer coating layer is determined by the final properties desired. In addition to abrasion resistance, antistatic or hydrophobic properties may, for example, be sought by using a coating layer of organic material.

However, it is advantageous for the monolithic outer layer to be formed from a mineral substance.

Preferably, the mineral substance of the monolithic outer layer is substantially identical to the mineral substance of the particles. This embodiment has the advantage that the resulting granule may be of high purity.

In a preferred embodiment of the invention, the granule contains no additives, such as binders or surfactants. In a preferred version of this embodiment, the granule contains no binder. Such granules may meet the strictest purity requirements, whether in the field of human foodstuffs or in the pharmaceutical field.

The invention also relates to a powder comprising a number of granules according to the invention described above.

The powder according to the invention may be formed exclusively from granules according to the invention. It may also include other granules, in variable proportions.

The width of the granule diameter distribution may vary greatly, since it depends essentially on the agglomeration technique used.

The powder according to the invention can be applied in various technical fields. In particular, powders according to the invention, comprising sodium bicarbonate granules, can be applied for the manufacture of detergents or pharmaceutical products.

The invention also relates to a process for manufacturing the powder according to the invention, in which, in a first step, agglomerates of particles of a mineral substance are formed, which process is characterized in that, in a second step, the agglomerates are coated with a monolithic layer.

The function of the first step of the process according to the invention is to agglomerate particles whose mean diameter is too small for the intended applications, in order to form agglomerates whose mean diameter is suitable for these applications. Any known agglomeration technique may be used-for example, sintering, palletizing or compacting.

As indicated above, depending on the mineral substance from which they are formed and on the technique used to agglomerate them, the particles adhere to a greater or lesser extent to one another. However, a minimum level of adhesion is necessary in order to ensure cohesion of the agglomerate before it is coated.

In a particular method of implementing the process according to the invention, the particle agglomerates are formed by compacting. Any suitable compacting technique may be used. In an advantageous version of this method of implementation, the particles are compacted by compression between two rolls. The cake obtained is then crushed in order to obtain the agglomerates of desired size. The product obtained from the crushing is screened, excessively fine agglomerates being recycled into the compacting operation.

In the second step of the method according to the invention, the agglomerates are coated with a monolithic layer. The choice of coating technique used (for example, dusting, spraying or immersion) depends on the precise circumstances of application of the process according to the invention.

In an advantageous version of the process according to the invention, to coat the agglomerates a supersaturated solution of a constituent substance of the monolithic layer is made to pass through a bed of the agglomerates. The bed may or may not be fluidized. However, fluidized beds are preferred. Crystal growth by passing a supersaturated solution through a fluidized bed has been described in document EP 0 352 847 (SOLVAY SA). For its application to the process according to the invention, the bed is formed from the agglomerates to be coated. The supersaturation of the saturated solution may be obtained by cooling the latter before it comes into contact with the bed.

In the implementation version in which the monolithic layer and the agglomerates are formed from sodium bicarbonate, it has been found that the temperature of the bed is advantageously above 30° C. However, it is not worthwhile for this temperature to exceed 70° C.

In a preferred way of implementing this version, the temperature of the bed is above 40° C. and below 60° C.

In another advantageous version of the process according to the invention, in order to coat the agglomerates, a supersaturated solution of a constituent substance of the monolithic layer is sprayed onto them. In a preferred way of implementing this version, the agglomerates are introduced continuously into an inclined rotating drum which is sprayed with the supersaturated solution. The movement of the drum ensures homogeneous distribution of the monolithic layer around the agglomerate. After a sufficient residence time (that depends in particular on the desired thickness of the coating layer and may be set by the inclination, the dimensions and the speed of rotation of the drum), the coated agglomerates are removed from the drum.

The invention is illustrated by the following description with reference to the appended drawing.

The single figure represents the diagram of a plant for carrying out one particular way of implementing the process according to the invention.

The plant shown schematically in the figure, the description of the operation of which follows, comprises a roll compactor 2, a crusher 4, a screen unit 6, a saturation tank 8, a heat exchanger 10, a fluidized-bed crystallizer 12 and a dryer 14.

Sodium bicarbonate particles 1 are introduced into the roll compactor 2. A compacted cake 3 is produced therein. The cake 3 is crushed in the crusher 4 into agglomerates 5. A fraction 7, having particle sizes between 500 and 1000 μM, is selected from the agglomerates 5 by means of a screen unit 6. The undersize 16 having dimensions of less than 500 μm is recycled into the compactor 2, whereas the oversize 17 having dimensions of greater than 1000 μm is recycled into the crusher 4. The selected agglomerates 7 are introduced into the crystallizer 12, the fluidized bed of which is formed by said agglomerates. A saturated sodium bicarbonate solution 9 is produced in the saturation tank 8. This solution is then cooled in the heat exchanger 10 so as to produce a supersaturated sodium bicarbonate solution 11. The supersaturated solution 11 is introduced into the crystallizer 12, where it fluidizes the bed of crystals. The solution 11 is desupersaturated on contact with the crystals and the latter are thus progressively coated with a monolithic layer of sodium bicarbonate. The wet, coated bicarbonate 13, collected from the crystallizer 12, is dried in the dryer 14 in order to supply the final product 15.

In a preferred embodiment of the plant shown in the figure, the saturation tank 8, the exchanger 10 and the crystallizer 12 are combined into a single apparatus, of the type described in European Patent 0 352 847 (SOLVAY SA).

The examples, the description of which will follow, bring out the benefit of the invention.

EXAMPLE 1

Not According to the Invention

Compacted and crushed sodium bicarbonate agglomerates, the particle size of which was between 500 and 1000 μm, were subjected to the following mechanical abrasion test.

100 g of granules were placed in a rotating cylindrical drum having an inside diameter of 57 mm and a length of 120 mm, in the presence of 400 g of lead beads 6 mm in diameter. The drum was then rotated at 140 rpm for 30 minutes. After the treatment, an "abrasion resistance index" was measured, this being defined as the fraction, in percent by weight, of the content of the drum that passes through a 63 μm sieve. The result of the test was 3%.

EXAMPLE 2

According to the Invention

A bed of 100 g of compacted and crushed sodium bicarbonate agglomerates, the particle size of which was between 500 and 1000 μm, was placed on the fluidization mesh of a fluidization column, the column being in contact with a thermostatic bath whose temperature was set at 50° C. The bed was fluidized by the ascending flow, at a velocity of 154 m/h, of a supersaturated sodium bicarbonate solution through the fluidization mesh. The supersaturation of the solution was set at 2.4 g/kg thanks to a temperature drop of 1.9° C. of the solution through the exchanger.

The coating of the agglomerates was continued for one hour, after which the granules were collected and the mean thickness of the coating layer was measured, namely 3 μm. The granules according to the invention produced in this way were then subjected to the abrasion test defined above in Example 1. The result was 0.6%, demonstrating the very considerable improvement in their abrasion resistance as a result of the coating according to the invention.

EXAMPLE 3

According to the Invention

The procedure for this example was as in Example 2, except that the supersaturation was set at 4.9 g/kg, after which a 10 μm coating layer was deposited on agglomerates. The result of the abrasion test was 0.1%, again showing an improvement in the abrasion resistance of the granules according to the invention.

The invention claimed is:

1. A granule, consisting of:
   an agglomerate of particles and a monolithic layer,
   wherein the agglomerate of particles is coated with the monolithic layer, and
   wherein the agglomerate consists of a first mineral and the monolithic layer consists of a single second mineral.

2. The granule according to claim 1, wherein at least one of the first or second minerals is sodium bicarbonate.

3. The granule according to claim 1, wherein the monolithic layer has a thickness of between 0.25 and 50 μm.

4. The granule according to claim 1, wherein the monolithic layer is crystalline.

5. The granule according to claim 1, wherein the monolithic layer is a polycrystal.

6. The granule according to claim 1, wherein the monolithic layer is a single crystal.

7. The granule according to claim 1, wherein the monolithic layer has a thickness of between 0.5 and 30 μm.

8. A powder comprising the granule according to claim 1.

9. A process for manufacturing the powder according to claim 8, comprising:
   forming the agglomerates consisting of the particles, and
   coating the agglomerates with the monolithic layer,
   wherein the agglomerates consist of the first mineral and the monolithic layer consists of the second mineral.

10. The process according to claim 9, wherein the forming is compacting.

11. The process according to claim 9, wherein the coating is carried out by passing a super saturated solution of the second mineral through a bed of the agglomerate.

12. The process according to claim 9, wherein the coating is carried out by passing a super saturated solution of the second mineral through a bed of the agglomerate.

13. The granule according to claim 1, having a particle size of between 500 to 1000 μm.

14. The granule according to claim 1, having a mean diameter of between 200 to 500 μm.

15. The granule of claim 1, having a mean diameter of between 250 and 2,500 μm.

16. The granule of claim 1, wherein the first and the second minerals are each a single mineral independently selected from the group consisting of sodium chloride, magnesium chloride, sodium carbonate and sodium bicarbonate.

17. The granule of claim 1, wherein the first and the second minerals are the same.

18. The granule of claim 1, wherein the first and second minerals are each a single mineral.

19. A granule, consisting of:
   an agglomerate of particles and a monolithic layer,
   wherein the agglomerate of particles is coated with the monolithic layer, and
   wherein the granule is obtained by
   forming the agglomerate of particles from a first mineral, and
   coating the agglomerate of particles with a single second mineral to form the monolithic layer.

20. The granule according to claim 19, wherein at least one of the first or second minerals is sodium bicarbonate.

21. The granule according to claim 19, wherein the monolithic layer has a thickness of between 0.25 and 50 μm.

22. The granule according to claim 19, wherein the monolithic layer is crystalline.

23. The granule according to claim 19, wherein the monolithic layer is a polycrystal.

24. The granule according to claim 19, wherein the monolithic layer is a single crystal.

25. The granule according to claim 19, wherein the monolithic layer has a thickness of between 0.5 and 30 μm.

26. A powder comprising the granule according to claim 19.

27. The granule according to claim 19, having a particle size of between 500 to 1000 μm.

28. The granule according to claim 19, having a mean diameter of between 200 to 500 μm.

29. The granule of claim 19, having a mean diameter of between 250 and 2,500 μm.

30. The granule of claim 19, wherein the first and the second minerals are each a single mineral independently selected from the group consisting of sodium chloride, magnesium chloride, sodium carbonate and sodium bicarbonate.

31. The granule of claim 19, wherein the first and the second minerals are the same.

* * * * *